(12) United States Patent
Iverson

(10) Patent No.: US 6,207,097 B1
(45) Date of Patent: Mar. 27, 2001

(54) METHOD FOR MANUFACTURING PHYSICAL OBJECTS USING PRECISION STEREOLITHOGRAPHY

(76) Inventor: Norma Jean Iverson, 1800 de la Cruz Blvd., San Clara, CA (US) 95050

(*) Notice: Subject to any disclaimer, the term of this patent is extended or adjusted under 35 U.S.C. 154(b) by 0 days.

(21) Appl. No.: 09/251,699

(22) Filed: Feb. 17, 1999

Related U.S. Application Data

(60) Provisional application No. 60/075,146, filed on Feb. 18, 1998.

(51) Int. Cl.[7] .......................... B29C 35/08; B29C 41/02
(52) U.S. Cl. ............................................. 264/401
(58) Field of Search ............................................. 264/401

(56) References Cited

U.S. PATENT DOCUMENTS

| | | |
|---|---|---|
| 4,078,229 | 3/1978 | Swanson et al. . |
| 4,238,840 | 12/1980 | Swainson . |
| 4,333,165 | 6/1982 | Swainson et al. . |
| 4,466,080 | 8/1984 | Swainson et al. . |
| 4,471,470 | 9/1984 | Swainson et al. . |
| 4,575,330 | 3/1986 | Hull . |
| 4,929,402 | 5/1990 | Hull . |
| 4,945,032 | 7/1990 | Murphy et al. . |
| 4,960,674 | 10/1990 | Fudim et al. . |
| 5,015,424 | 5/1991 | Smalley . |
| 5,058,988 | 10/1991 | Spence . |
| 5,059,021 | 10/1991 | Spence et al. . |
| 5,059,359 | 10/1991 | Hull et al. . |
| 5,076,974 | 12/1991 | Modrek et al. . |
| 5,094,935 | 3/1992 | Vassiliou et al. . |
| 5,104,592 | 4/1992 | Hull et al. . |
| 5,122,441 | 6/1992 | Lawton et al. . |
| 5,123,734 | 6/1992 | Spence et al. . |
| 5,130,064 | 7/1992 | Smalley et al. . |
| 5,133,987 | 7/1992 | Spence et al. . |
| 5,137,662 | 8/1992 | Hull et al. . |
| 5,141,680 | 8/1992 | Almquist et al. . |
| 5,167,882 * | 12/1992 | Jacobine et al. ..................... 264/401 |
| 5,174,943 | 12/1992 | Hull . |
| 5,182,055 | 1/1993 | Allison et al. . |
| 5,182,056 | 1/1993 | Spence et al. . |
| 5,182,715 | 1/1993 | Vorgitch et al. . |
| 5,184,307 | 2/1993 | Hull et al. . |
| 5,192,469 | 3/1993 | Smalley et al. . |
| 5,192,559 | 3/1993 | Hull et al. . |
| 5,209,878 | 5/1993 | Smalley et al. . |
| 5,234,636 | 8/1993 | Hull et al. . |
| 5,236,637 | 8/1993 | Hull . |
| 5,256,340 | 10/1993 | Allison et al. . |
| 5,267,013 | 11/1993 | Spence . |
| 5,273,691 | 12/1993 | Hull et al. . |
| 5,435,902 | 7/1995 | Andre, Sr. . |

OTHER PUBLICATIONS

IBBS, K. et al. "Rapid Prototyping: New Lasers Make Better Parts, Faster." *Photonics Spectra* (Jun. 1977).*

* cited by examiner

*Primary Examiner*—Leo B. Tentoni
(74) *Attorney, Agent, or Firm*—Francis H. Lewis

(57) ABSTRACT

An improved method for stereolithographic fabrication of structures provides a stereolithography system with a laser light source that is substantially smaller than previously known light sources, and produces a beam that is focused to a smaller spot size, preferably a He—Cd laser operating at approximately 30 mw in the pure TEM00 mode. The method utilizes this system to fabricate smaller structures with substantially higher precision than previously obtained with the stereolithographic technique. The method includes the steps of leveling the stereolithographic apparatus, measuring the actual focused beam spot size to determine the beam width compensation value, building a test structure to determine shrink compensation factors, and entering these data into software data files that are used by a computer to control the fabrication process. The method includes further modifications to the software data files, including modifications of the recoating, overcure, and build parameters, and the configuration files. With these modifications, the method is capable of stereolithographic fabrication of structures using slice layer thicknesses of 3 mils or less, and the fabricated structures have dimensional tolerances substantially smaller than the tolerances in previously fabricated structures. The method also reduces production time even using small slice thicknesses.

11 Claims, 1 Drawing Sheet

METHOD FOR MANUFACTURING PHYSICAL OBJECTS USING PRECISION STEREOLITHOGRAPHY

CROSS REFERENCE TO RELATED APPLICATIONS

This application claims the benefit of U.S. Provisional Application Ser. No. 60/075,146, filed Feb. 18, 1998. This Provisional Application Ser. No. 60/075,146 is hereby incorporated by reference in its entirety into the present application.

BACKGROUND OF THE INVENTION

1. Field of the Invention

This invention pertains generally to methods for fabricating three dimensional objects, and more particularly to methods for generating such objects using stereolithographic techniques.

2. Description of the Background Art

Stereolithography is a technique that was originally developed for rapidly producing prototypes of three-dimensional physical parts that are designed using computer-aided design (CAD) methods. This technique is basically a "three-dimensional printing process" that produces a solid plastic model of the CAD part by using a laser beam to draw cross sections of the part on the surface of a photo-curable liquid plastic or resin. The apparatus for carrying out this method, termed Stereolithography Apparatus (SLA), includes a computer program for slicing the CAD model into thin cross sections. One embodiment of this method includes focusing a laser beam to a small intense spot on the surface of the liquid resin by means of a computer-controlled optical scanning system. The beam cures liquid resin to a solid at the locations on the surface corresponding to the cross section of a given layer in the CAD model. A computer-controlled elevator system then lowers the newly-formed layer into the liquid for a distance comprising the layer thickness, and another layer is formed on top in a similar manner, such that each layer adheres to the layer below it. The solid model is thus built up, layer by layer, from successive cross sections of the CAD model, starting from the bottom up to the top of the model. The entire process is controlled by a computer, which effectively converts the CAD data for a physical three-dimensional object into a solid model realization.

This technique has been described in detail in the technical literature, including a series of patents that disclose this technique and associated SLA devices. Reference is made to U.S. Pat. No. 4,575,330 (Hull), issued Mar. 11, 1986, which is one of the earlier patents describing this technology. This technique has been further discussed extensively in the text entitled *Rapid Prototyping and Manufacturing; Fundamentals of Stereolithography* by Paul F. Jacobs, published in 1992 by the Society of Manufacturing Engineers. The foregoing references are incorporated herein by reference. Apparatus for carrying out this technique is currently manufactured and sold by 3D Systems, Inc. of Valencia, Calif.

Previously, the known stereolithographic systems have been used to fabricate relatively large prototype parts of limited precision. The above-identified reference, "*Rapid Prototyping and Manufacturing; Fundamentals of Stereolithography*", p. 314, reports that the overall dimensional accuracy of prototype parts fabricated by SLA approaches 5 mils (0.005 inches), compared with the CAD model values. This 5-mil resolution value is the extreme limit, and SLA-fabricated parts more typically have a resolution in the 10 mil region. The SLA system manufactured by 3D Systems, Inc. produces parts in which the minimum horizontal feature size is limited to about 10 mils, and the laser beam positioning accuracy is limited to 5 mils (SLA-250 User's Manual, Page B-1). Therefore the stereolithography technique that is known to persons of ordinary skill in the art is unsatisfactory for production of very small parts with high precision, where the above resolution limits exceed the acceptable tolerances for such high precision parts. It is desirable to adapt and modify the known stereolithography techniques for fabricating small parts with accuracies and tolerances at least 10 times smaller than the above limits (i.e. 10 times higher precision).

SUMMARY OF THE INVENTION

The present invention comprises an improved method for stereolithographic fabrication of small precision plastic parts. This method is an adaptation and modification of the stereolithographic methods disclosed previously and known to persons of ordinary skill in the art. In a preferred embodiment, the method is carried out using the SLA 250-40 stereolithography system manufactured by 3D Systems, Inc. of Valencia, Calif., with an epoxy-based resin material sold under the trademark CIBATOOL SL 5170, and manufactured by Ciba-Geigy, Ltd. of Marly, Switzerland. The SLA-250 system is sold with a user's manual which describes in detail the method specified by the manufacturer for fabricating parts with the system. Therefore, the method of the present invention comprises additional steps with reference to the manufacturer's specified method, and also modifications of these steps. In short, this invention is an improvement of previously known techniques for stereolithography, as will be understood by persons of ordinary skill in the art who are familiar with the above user's manual, together with the other references identified above.

The first step in the improved method is to level the SLA machine. The surface of the liquid resin should achieve horizontal accuracy to ensure uniformity in the prototype layers.

The second step is to modify the laser used in the SLA-250 system. This modification procedure is described in detail in the article entitled "*Rapid Prototyping: New Lasers Make Better Parts, Faster*" by Kenneth Ibbs and Norma Jean Iverson (the present applicant), published in the June, 1997 issue of *Photonics Spectra* by Laurin Publishing Co., Inc. This article is included in the above-identified provisional application as "Appendix A" and is incorporated herein by reference. The preferred laser is a 30 mw He—Cd laser operating at a wavelength of 325 nm in the pure TEM00 mode, such as the Model 3630NX laser system manufactured by LiCONiX, Inc. of Santa Clara, Calif. The beam from this laser may be focused to a spot of approximately 3 mils diameter at the resin surface.

The next step is to measure the actual diameter of the beam spot. This value is then entered into the data files for the software controlling the computer that is included in and operates the SLA 250 system. This parameter is called the "beam width compensation value", identified in the software as "COMP".

Next, it is desirable to determine the shrink compensation factors (SCF) for both the "x" and "y" directions by building a test part using the stereolithographic process. A preferred structure for this step is the "AT Part", described and illustrated in Section 11.3, pages 302–306 of the above-identified reference, "*Rapid Prototyping and Manufactur-* ing; Fundamentals of Stereolithography", wherein the side length of the outer square is approximately 8 inches, and the inner square boxes have sides approximately 1 inch in length. The SCF parameters are entered also into the software data files.

The slice layer thickness for the stereolithographic process must also be entered into the software data files. In a preferred embodiment of the invention this parameter may range from 6 mils down to 3 mils or less.

For these values of the slice thickness, and the variables determined as described above, other software parameters for the SLA system are further modified. Changed parameters include "Zdip velocity", "contour", "minimum full widths", "hatch type" (set equal to "box"), and "hatch spacing" (set to 2–4 mils for 6 mil layer thickness). In addition, the parameters governing "pre-dip" and "post-dip" delays are changed, as well as the parameters determining compensation for jagged layer buildup. In a perferred embodiment of the method, parameter listings are included in the above-identified provisional application as "Appendix B", which is incorporated herein by reference. These parameters are for the "ACES" ("Accurate Clear Epoxy Solid") part building style, described in the SLA-250 User's Manual, and differ from the parameter settings normally furnished by the manufacturer in the SLA-250 system.

It should be noted that the laser used in the preferred method produces a smaller beam power than that used in previous stereolithographic fabrication processes. This reduced beam power arises from the reduced focused beam spot size in the pure TEM00 mode of laser operation, which allows fabrication of parts with higher resolution. In order to carry out the fabrication process at such low power, it is necessary to modify the normal stereolithography process parameters as set forth above. These modifications are an important and novel feature of the preferred embodiments of the invention.

With the foregoing additional or modified steps, the procedure for stereolithographic fabrication has been carried out as described in the references identified above to make small parts with much higher precision than heretofore achieved. For example, test clips for integrated circuit inspection and diagnosis have been fabricated by this new technique. The method successfully produces clips having teeth approximately 6 mils wide, with size and position tolerances of approximately 0.2 mils. Thus, this new method overcomes the precision limitations that have been inherent in previous stereolithographic fabrication processes. Finally, the fabrication time of present method for the above test clips is in the range of 6–10 hours per batch. Therefore this method is not limited to prototype fabrication, but may be used for actual production fabrication.

It is an object of this invention to provide an improved stereolithographic method for fabrication of small structures.

A second object of this invention is to provide an improved stereolithographic method for fabrication of small structures with high precision.

Another object of this invention is to provide an improved stereolithographic method for fabrication of small structures with reduced fabrication time.

These and other objects, advantages, characteristics and features of the invention may be better understood by examining the following drawings together with the detailed description of the preferred embodiments.

DETAILED DESCRIPTION OF THE PREFERRED EMBODIMENTS

Figure 1:
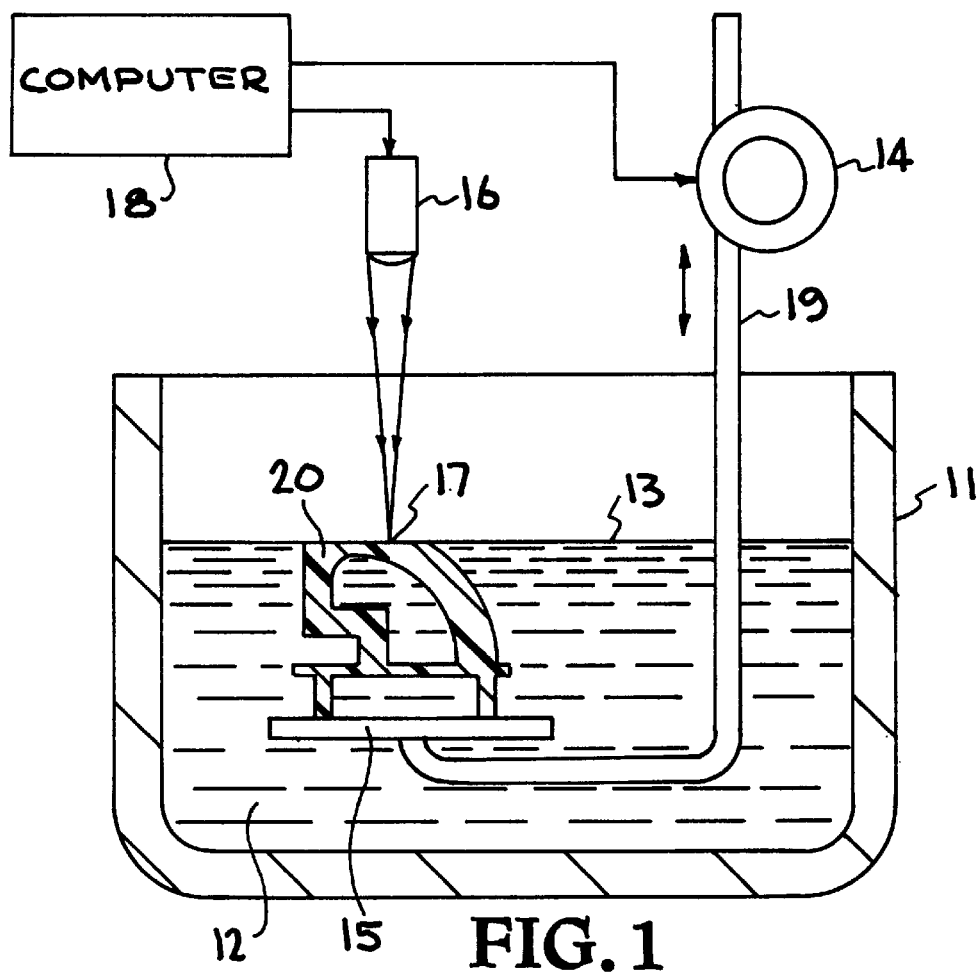
FIG. 1 is a schematic drawing and elevational sectional view of apparatus preferably used to practice the method of the present invention for stereolithographic fabrication of small structures.

FIG. 1 is a schematic drawing and elevational sectional view of apparatus, such as the above-described SLA-250 system, that may be used to carry out the preferred method of the present invention. The vat 11 contains a reservoir of photocurable liquid resin 12 having an upper surface 13. A controlled laser source 16 generates a focused spot of light 17 at the surface 13 of the resin. The position of this spot may be controlled and moved in the plane of the surface 13 by means of movable mirrors or similar means that are not shown in the drawing and are part of the source 16. A platform 15 is submerged in the liquid resin 12 and is attached to a support member 19 which is movable in the vertical direction in a controlled manner by a position control means 14, such as a stepper motor or similar device. This position control means 14 controls the elevation of the platform 15 in the liquid resin 12. Both the position control means 14 and the laser source 16 are controlled by a computer 18, which governs the elevation of the platform 15 and the location 17 of the focused spot of light 17 in the surface plane 13. Further means are provided, not shown in FIG. 1, for maintaining the surface 13 of the liquid resin at a constant level.

The computer 18 is provided with CAD software for designing a three-dimensional structure. Additional software is provided for controlling the laser source 16 and the elevation of the platform 15 to fabricate this structure. As shown in the drawing, at a given elevation of the platform 15 the position of the laser spot 17 is moved through various horizontal locations, causing a layer of resin to cure and solidify at these locations. When formation of this layer is completed, the platform 15 is lowered slightly to submerge this formed layer and allow liquid resin to flow over the upper surface of the formed layer. The laser spot 17 is then moved through various positions of the surface 13 to form another cured and solidified layer, which adheres to the previous layer immediately below the surface. Thus, a complete structure 20 may be fabricated layer by layer. Following such fabrication the structure 20 is removed from the resin 12, and various post-curing and washing procedures, known in the art, are carried out to produce the finished structure.

The thickness of the layers illustrated in FIG. 1 is exaggerated for purposes of clarity. Obviously it is desirable to fabricate layers that are thinner to produce structures having greater dimensional precision. Furthermore, it is desirable to fabricate thinner layers for structures that are smaller. The layer thickness is affected by the power of the focused spot 17 and the incremental elevation changes of the platform 15. In addition, the total fabrication time for a given structure is affected by the thickness of the layers, or the number of layers that must be formed, as well as the curing time for each layer. The optimal fabrication procedure for small precision structures is obtained by modifying the conventional stereolithography process for the SLA-250 system as follows. The main steps in the improved process are illustrated schematically in FIG. 2.

Figure 2:
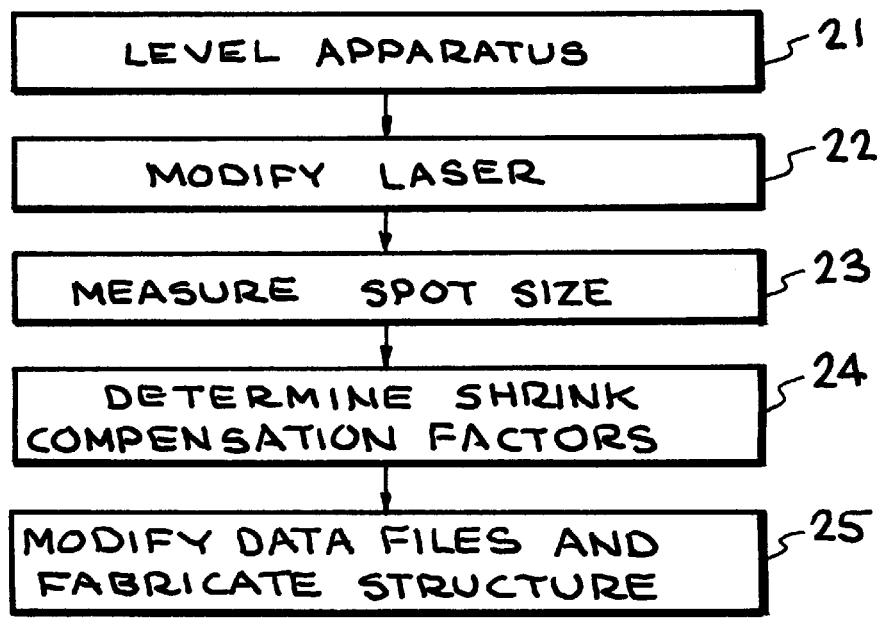
FIG. 2 is a block diagram flow chart illustrating the main steps in the preferred embodiment of the present invention.

Referring to FIG. 2, the first step 21 is to level the apparatus in order to make sure that the fabricated structure layers are uniform.

The second step 22 is to modify the laser source 16 used in the apparatus. In particular, it is desirable to use a small laser that produces a small focused spot 17. In one preferred embodiment the source 16 is a 30 mw He—Cd laser operating at a wavelength of 325 nm in the pure TEM00 mode, such as the Model 3630NX laser system described above. The beam may be preferably focused to a spot of approximately 3 mils diameter at the resin surface. Other small lasers may also be used.

The next step 23 is to measure the actual diameter of the laser beam spot 17. This value is entered into the software data files in the computer 18 as the "beam width compensation value". In the SLA-250 system this variable is identified as "COMP".

The following step 24 is to determine the shrink compensation factors (SCF) for both the "x" and "y" directions by building a test part using the stereolithographic process. A preferred structure for this step is the "AT Part" ("Acceptance Test Part"), which is a standard structure described and illustrated in the above-identified reference, "Rapid Prototyping and Manufacturing; Fundamentals of Stereolithography", Section 11.3, pp. 302–306. The dimensions of the finished AT Part are measured and compared with their nominal design values to determine the "x" and "y" shrink compensation factors values. These values are entered also into the software data files.

Finally, in step 25 the parameter values in the software data files in the computer 18 are modified and the apparatus of FIG. 1 is operated to fabricate the desired structure. More specifically, the CAD program is utilized to design the structure, and the design data it utilized by the control software to carry out the stereolithography fabrication process. The modified parameter values include the values determined in the previous steps. In addition, other parameters are modified to enable the system to be operated with the modified laser source described in step 22. These additional modifications depend in part on the selected layer thickness, part building style, resin composition, and the previously determined parameter values.

In a preferred embodiment, the apparatus of FIG. 1 is the SLA-250 system, and the laser source 18 is the Model 3630NX laser system described in step 22 above. The part building style is the "ACES" method identified previously, and the liquid resin 12 is composed of the epoxy-based resin material, also described previously, sold under the trademark CIBATOOL SL 5170. For this material the resin-specific parameters Dp and Ec are set to Dp=0.0048 and Ec=13.5.

For a layer parameter set to 3 mils, the recoating parameters (referring to the movement of the platform 15) are preferably set to values:

ZDip=0.25 (this may range from −1.0 to 0.8)
ZDipVel=0.05 (may be increased to 0.1)
ZDipAccel=0.05 (may be increased to 2.0)
ZDipDelay=1 (may be increased to 15)
PreDipDelay=15 (may be increased to 30)
levelwait=30 (may be increased to 45)
numSweeps=1 (may range from 1 to 3)
bladeGapl=110
bladevell=7

These modified parameters are applicable to the portion of the process in which the desired structure is being built. For the portion in which the supports for the structure are being fabricated, it is not necessary to modify all of the above parameters, but only the following parameters:

ZDip=0.25
PreDip Delay=10
levelWait=15

For the "ACES" part building process the "overcure" and "build" parameters depend to some extent on the slice thickness. For 3 mil layers, the following parameter modifications are preferable:

startZ=0.20
HatchSpaces=(0.002 0.002 0.002 0.002)
ocLB=0.0015 (overcure, lower border)
ocLH=−0.0008 (overcure, hatch fill)
ocLF=0.005 (overcure, lower fill depth)
NFDB=0.0015 (near fill down border)
NFDH=−0.0008 (near fill down hatch)
NFUB=0.0015 (near fill up border)
FUB=0.0015 (fill up border)
FDB=0.0015 (fill down border)
FUF=0.0045 (fill up skin)
FDF=0.0045 (fill down skin)
NFDF=0.0045 (near fill down skin)
MinSkinArea=0.001

These parameter modifications are for 3 mil slices, and other layer thicknesses will call for slightly different modifications. For example, the parameter modifications for 6 mil layers are set forth in Appendix B of U.S. Provisional Application Ser. No. 60/075,146, filed Feb. 18, 1998, which is incorporated by reference herein.

Finally, various parameters in the configuration ("PARTMAN.CNF", etc.) software data files are modified; typical values are as follows:

CureWidthMils11=2.9 (beam diameter)
ZDipvelocityNormal=0.08
ZDipVelocityMedium=0.06
ZDipvelocitySlow=0.03 (platform speed parameters)
vat250 xmax=10.5
vat250 ymax=10.5
vat250 zmax=10.5
contour=0 (may range up to 1)
area=0.0001

As discussed previously, these parameter modifications, together with the other steps of the method disclosed above, have been utilized to fabricate structures by the stereolithographic process with dimensional tolerances as small as ½ mil, and with structural features as small as 6 mils. This resolution is a substantial improvement compared to the precision of structures that have been stereolithographically produced by previous methods. Furthermore, the method disclosed herein has the capability of producing such structures with a reduced fabrication time, and therefore this method is suitable for production fabrication, in addition to fabrication of prototype structures.

Persons of ordinary skill in the art to which the invention pertains will recognize from the foregoing that the practice of this method is not restricted to the particular values of variables and parameters set forth above, and other equivalent sets of variables and parameter values may be utilized. The foregoing description of the preferred embodiments of the invention has been presented solely for purposes of illustration and description, and is not exhaustive or limited to the precise forms disclosed. Many modifications and variations are possible in light of the above teaching. The spirit and scope of the invention are to be defined by reference to the following claims, along with their full scope of equivalents.

What is claimed is:

1. In a system for fabricating a three-dimensional structure by means of stereolithography, said system including:

a controllable source of light for generating a focused light beam at a selectable and variable location;

a vat containing liquid photocurable material, said liquid having an upper surface on which said beam is brought to a focus;

a horizontal platform immersed in said liquid photocurable material, said platform further being attached to a support member and the elevation of said platform being controllably movable in the vertical direction by means of said support member;

platform control means attached to said support member, for controlling and varying the elevation of said platform; and a computer connected to said platform control means and said controllable source of light, said computer having a memory containing control software and data files for controlling said platform control means and said controllable source of light, said computer further containing design software for designing said three-dimensional structure;

an improved method for fabricating a three-dimensional structure by means of stereolithography, comprising the steps of:

providing a source of light as said light source that is substantially smaller and lower in power, and that generates a smaller focused spot, than light sources conventionally used in stereolithographic fabrication processes;

modifying the parameters and variables in said data files to fabricate a structure in said system with said light source that is substantially smaller and lower in power and generates a smaller focused spot, with substantially higher precision than 10 mils; and carrying out the stereolithographic fabrication process utilizing said light source that is substantially smaller and lower in power and generates a smaller focused spot, and said modified parameters and variables to fabricate said three-dimensional structure.

2. The method recited in claim 1, wherein said light source comprises a laser generating power not exceeding 30 mw.

3. The method recited in claim 2, wherein said laser is operated in the pure TEM00 mode.

4. The method recited in claim 2, wherein said laser is a He—Cd laser operating at a wavelength of substantially 325 nm.

5. The method recited in claim 4, wherein said laser is operated in the pure TEM00 mode.

6. The method recited in claim 1, wherein said liquid photocurable material comprises epoxy-based resin material.

7. The method recited in claim 1, wherein said step of modifying the parameters and variables in said data files comprises modification of recoating parameters, overcure parameters, build parameters, and configuration files.

8. The method recited in claim 1, further comprising the steps, prior to the step of carrying out the stereolithographic fabrication process, of:

measuring the actual diameter of said focused light beam produced by said light source; and modifying the parameters and variables in said data files to represent said actual diameter.

9. The method recited in claim 1, further comprising the steps, prior to the step of carrying out the stereolithographic fabrication process, of:

fabricating a test structure by means of said stereolithographic process;

measuring the actual dimensions of said test structure;

comparing said measured dimensions with the nominal dimensions for said test structure to determine shrink compensation factors for the stereolithographic process; and modifying the parameters and variables in said data files to represent said shrink compensation factors.

10. The method recited in claim 9, further comprising the step, prior to the step of carrying out the stereolithographic fabrication process for said test structure, of leveling said system.

11. The method recited in claim 1, further comprising the step, prior to the step of carrying out the stereolithographic fabrication process, of leveling said system.

* * * * *